US009824047B2

(12) United States Patent
Sadeghi et al.

(10) Patent No.: US 9,824,047 B2
(45) Date of Patent: *Nov. 21, 2017

(54) DISCOVERY MECHANISMS FOR UNIVERSAL SERIAL BUS (USB) PROTOCOL ADAPTATION LAYER

(71) Applicant: Intel Corporation, Santa Clara, CA (US)

(72) Inventors: Bahareh Sadeghi, Portland, OR (US);
Carlos Cordeiro, Portland, OR (US);
Abdul Ismail, Beaverton, OR (US);
Emily H. Qi, Gig Harbor, WA (US);
Necati Canpolat, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 14/729,399

(22) Filed: Jun. 3, 2015

(65) Prior Publication Data

US 2016/0085703 A1  Mar. 24, 2016

Related U.S. Application Data

(63) Continuation of application No. 13/728,820, filed on Dec. 27, 2012, now Pat. No. 9,075,923.

(51) Int. Cl.
*G06F 13/42* (2006.01)
*G06F 13/38* (2006.01)

(52) U.S. Cl.
CPC .......... *G06F 13/387* (2013.01); *G06F 13/385* (2013.01); *G06F 13/4282* (2013.01)

(58) Field of Classification Search
CPC ... G06F 13/387; G06F 13/4282; G06F 13/385
See application file for complete search history.

(56) References Cited

U.S. PATENT DOCUMENTS 7,865,640 B1  1/2011  Lewis et al.
9,075,923 B2  7/2015  Sadeghi et al.
(Continued)

FOREIGN PATENT DOCUMENTS

CN       104813714 A     7/2015
WO   WO-2008114081 A1   9/2008
(Continued)

OTHER PUBLICATIONS

"European Application Serial No. 13868913.8, Extended European Search Report dated Jul. 19, 2016", 8 pgs.
(Continued)

*Primary Examiner* — Jing-Yih Shyu
(74) *Attorney, Agent, or Firm* — Schwegman Lundberg & Woessner, P.A.

(57) ABSTRACT

A WiFi serial bus (WSB) attribute for use in Wi-Fi Alliance defined point-to-point (P2P) discovery mechanism includes a plurality of fields disposed in the frame. The WiFi serial bus attribute is arranged to provide information in the plurality of fields to support connectivity decisions for a USB device in a point-to-point network using a WSB protocol. The WSB attribute includes WSB architectural element information and information associated with a USB device behind a USB protocol adaptation layer (PAL).

17 Claims, 8 Drawing Sheets

(56) References Cited

U.S. PATENT DOCUMENTS

| | | |
|---|---|---|
| 2006/0176146 A1 | 8/2006 | Krishan et al. |
| 2007/0157020 A1 | 7/2007 | Lee et al. |
| 2007/0183424 A1 | 8/2007 | Ametsitsi |
| 2007/0214276 A1 | 9/2007 | Panabaker et al. |
| 2007/0263588 A1 | 11/2007 | Sathath et al. |
| 2008/0282002 A1 | 11/2008 | Takenaka |
| 2009/0154740 A1 | 6/2009 | Regen et al. |
| 2009/0198859 A1 | 8/2009 | Orishko et al. |
| 2009/0323697 A1 | 12/2009 | Celentano et al. |
| 2010/0027459 A1 | 2/2010 | Ikeda |
| 2011/0090830 A1 | 4/2011 | Churei |
| 2011/0276711 A1 | 11/2011 | Gong et al. |
| 2012/0265913 A1* | 10/2012 | Suumaki ............... H04W 4/008 710/303 |
| 2013/0246663 A1* | 9/2013 | Raveendran ........ G06F 13/4022 710/8 |
| 2013/0282938 A1* | 10/2013 | Huang .................. G06F 13/385 710/106 |
| 2014/0001874 A1* | 1/2014 | Nahidipour ............. H02J 17/00 307/104 |
| 2014/0019651 A1 | 1/2014 | Ben-harosh |
| 2014/0146745 A1* | 5/2014 | Huang .................... H04L 63/20 370/328 |
| 2014/0189172 A1 | 7/2014 | Sadeghi et al. |
| 2014/0335790 A1* | 11/2014 | Dees ................... H04M 1/7253 455/41.2 |

FOREIGN PATENT DOCUMENTS

| | | |
|---|---|---|
| WO | WO-2010052639 A1 | 5/2010 |
| WO | WO-2014105116 A1 | 7/2014 |

OTHER PUBLICATIONS

"European Application Serial No. 13868913.8, Response filed Mar. 7, 2016 to Communication pursuant to Rules 161(2) and 162 EPC dated Aug. 26, 2015", 12 pgs.

"U.S. Appl. No. 13/728,820, Non Final Office Action dated Nov. 3, 2014", 8 pgs.

"U.S. Appl. No. 13/728,820, Notice of Allowance dated Jan. 26, 2015", 6 pgs.

"U.S. Appl. No. 13/728,820, Response filed Jan. 7, 2015 to Non Final Office Action dated Nov. 3, 2014", 9 pgs.

"International Application Serial No. PCT/US2013/044316, International Preliminary Report on Patentability dated Jul. 9, 2015", 6 pgs.

"International Application Serial No. PCT/US2013/044316, International Search Report dated Sep. 5, 2013", 3 pgs.

"International Application Serial No. PCT/US2013/044316, Written Opinion dated Sep. 5, 2013", 4 pgs.

"Wireless Universal Serial Bus Specification 1.1", Hewlett-Packard, Intel, LSI, Microsoft, NEC, Samsung, ST-Ericsson, Revision 1.1, (Sep. 9, 2010).

Kim, Jin-Woo, et al., "A distributed MAC design for data collision-free wireless USB home networks", Consumer Electronics, IEEE Transactions, (Aug. 2009), 1337-1343.

Kim, Jin-Woo, et al., "Relay transmission protocol based on SoQ (Satisfaction of QoS) for QoS improvement in Wireless USB system", ICT Convergence (ICTC), 2012 International Conference on, (2012), 671-676.

Klunder, C, "An estimation of the back door coupling of UWB pulses on commercial wireless USB adapters", Electromagnetic Compatibility IEEE International Symposium on, (2008), 1-5.

Sherratt, R S, et al., "A Packet/Frame sync detector based on statistical mode with application to wireless-USB", Consumer Electronics IEEE International Symposium, (2008), 1-4.

U.S. Appl. No. 13/728,820, filed Dec. 27, 2012, Discovery Mechanisms for Universal Serial Bus (USB) Protocol Adaption Layer.

* cited by examiner

| Field | Size (octets) | Value | Description |
|---|---|---|---|
| Attribute ID | 1 | 2 | Identifying the type of P2P attribute. |
| Length | 2 | 2 | Length of the following fields in the attribute. |
| USB Version | 2 | variable | Identifying the USB Specification Number which the USB device behind the WSB PAL complies to. |
| USB Device Class | 1 | variable | Identifying the USB-IF defined Device Class of the USB device behind the WSB PAL. Shall be set to zero if not identified. |
| USB Device Sub-class | 1 | variable | Identifying the USB-IF defined Device Sub-class of the USB device behind the WSB PAL. Shall be set to zero if not identified. |
| WSB Capability Bitmap | 1 | variable | A set of parameters indicating P2P Device's WSB capabilities, as shown in Fig 4 |
| WSB String | 8 | variable | UNICODE string (UNICODE UTF-16LE encoding) identifying WSB friendly name |
| WSB Icon | variable | variable | Including one WSB icon. The format of WSB Icon field is shown in Fig 8 |
| USB Configuration Entry List | variable | variable | Including one or more USB Configuration Entries. The format of Configuration Entry field as shown in Fig 5 |

Fig. 3

| Bit(s) | Information | Notes |
|---|---|---|
| 0-2 | WSB Version | The version of WSB protocol supported |
| 3-4 | Architectural Element | The Architectural Element field identifies the WSB architectural element supported by the P2P Device.<br><br>Value  Meaning<br>0  WSB Host<br>1  WSB Hub<br>2  WSB Peripheral<br>3  Reserved |
| 5 | IP Support | The IP Support field shall be set to 1 when the P2P Device supports WSB IP option, and is set to 0 otherwise. |
| 6 | Available for Connection | The Available for Connection field shall be set to 1 when the P2P Device is available to connect with other WSB capable P2P Devices, and set to 0 otherwise. |
| 7 | Reserved | Reserved |

Fig. 4

| Field | Size (octets) | Value | Description |
|---|---|---|---|
| Number of Configurations | 1 | | Indicating the number of configurations contained in the USB Configuration List field. |
| Configuration List | variable | | Including one or more Configuration field. The format of Configuration field as shown in Fig 6 |

Fig. 5

| Field | Size (octets) | Value | Description |
|---|---|---|---|
| Number of Interfaces | 1 | | Indicating the number of interfaces contained in the Interface List field. |
| Interface List | variable | | Including one or more Interface. The format of Interface field as shown in Fig 7 |

| Field | Size (octets) | Value | Description |
|---|---|---|---|
| Interface Class | 1 | variable | Identifying the USB-IF defined Interface Class of the USB function exposed by the WSB PAL. Shall be set to zero if not identified. |
| Interface Sub-class | 1 | variable | Identifying the USB-IF defined Interface Sub-class of the USB function exposed by the WSB PAL. Shall be set to zero if not identified. |

Fig. 8

| Field | Size (octets) | Value | Description |
|---|---|---|---|
| Icon Type Length | 1 | variable | Identifying the length of the Icon Type field. |
| Icon Type | variable | variable | Containing the MIME media type of the Icon Binary Data. The Icon Type subfield is formatted in accordance with RFC-4288 and its value is selected from the IANA MIME media types registered at http://www.iana.org/assignments/media-types/index.html. |
| Icon Binary Data Length | 2 | variable | Identifying the length of the Icon Binary Data field. |
| Icon Binary Data | variable | variable | Containing the binary data for the icon encoded per the Icon Type field. |

DISCOVERY MECHANISMS FOR UNIVERSAL SERIAL BUS (USB) PROTOCOL ADAPTATION LAYER

CROSS-REFERENCE TO RELATED APPLICATION

This application is a continuation of U.S. patent application Ser. No. 13/728,820, filed Dec. 27, 2012, and published as U.S. 2014-0189172 on Jul. 3, 2014, issued as U.S. Pat. No. 9,075,923 on Jul. 7, 2015 which application and publication are incorporated herein by reference in their entirety.

BACKGROUND

Recently, application services of transmitting various multimedia data at high speed have been widely used in wireless communication fields. In addition, the potential market for consumer electronic (CE) devices with these services has grown. Electronic devices, such as computers and other devices, often transmit signals to receiving stations such as displays or speakers. Such transmission often occurs via wires or cables. However, wireless transmission offers freedom from wires and cables. For interoperability among various manufacturers' products, these devices may communicate according to a standard, such as the WiFi Alliance (WFA) and the Wireless Gigabit Alliance (WGA or WiGig) standard as described in one or more upcoming published specifications.

The Universal serial bus (USB) Protocol Adaptation Layer (PAL) is a technology that enables support of USB traffic over a medium other than USB. Specifically with the WiFi Alliance, the WiFi Serial Bus (WSB) provides USB PAL as a service for WiFi links, and similarly with the WiGig Alliance, WiGig Serial Extension (WSE) provides USB PAL as a service for WiGig links. On a wired USB, the user makes the decision of choosing and using a USB peripheral device by physically plugging it into the USB port on the USB host, e.g., by connecting a USB mouse to the PC. In contrast, when used over a wireless medium, the user needs to rely on discovery mechanisms provided by lower layers, e.g., media access control (MAC) mechanisms provided in data link layer (layer 2), internet protocol (IP) mechanisms provided in network layer (layer 3), etc., to learn about USB PAL capable devices which are available for connection.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 is a table showing the definitions for the WSB Attribute according to an embodiment;

FIG. 4 is a table describing the format of the WSB Capability Bitmap field according to an embodiment;

FIG. 5 is a table describing the format of the USB Configuration Entry field according to an embodiment;

FIG. 6 is a table describing the format of the Configuration field according to an embodiment;

FIG. 7 is a table describing the format of the Interface List field according to an embodiment;

FIG. 8 is a table describing the format of the WSB Icon field according to an embodiment;

DETAILED DESCRIPTION

The Universal serial bus (USB) Protocol Adaptation Layer (PAL) is a technology that enables support of USB traffic over a medium other than USB. A WiFi Serial Bus (WSB) provides USB PAL as a service for WiFi links and a WiGig Serial Extension (WSE) provides USB PAL as a service for WiGig links. The WSB protocol is a USB PAL protocol for providing USB over WiFi links. Point-to-Point (P2P) WiFi provides device-to-device connectivity. WSB needs to use P2P for discovery of available WSB devices. However, WiFi P2P does not apply to WSB. Embodiments described herein extend the applicability of P2P to the WSB protocol.

In one embodiment, a WSB attribute is arranged to provide for discovery of WSB enabled devices using the WiFi P2P framework. More specifically, a WSB Attribute according to an embodiment carries information for the user to be able to make an informed connectivity decision.

Figure 1:
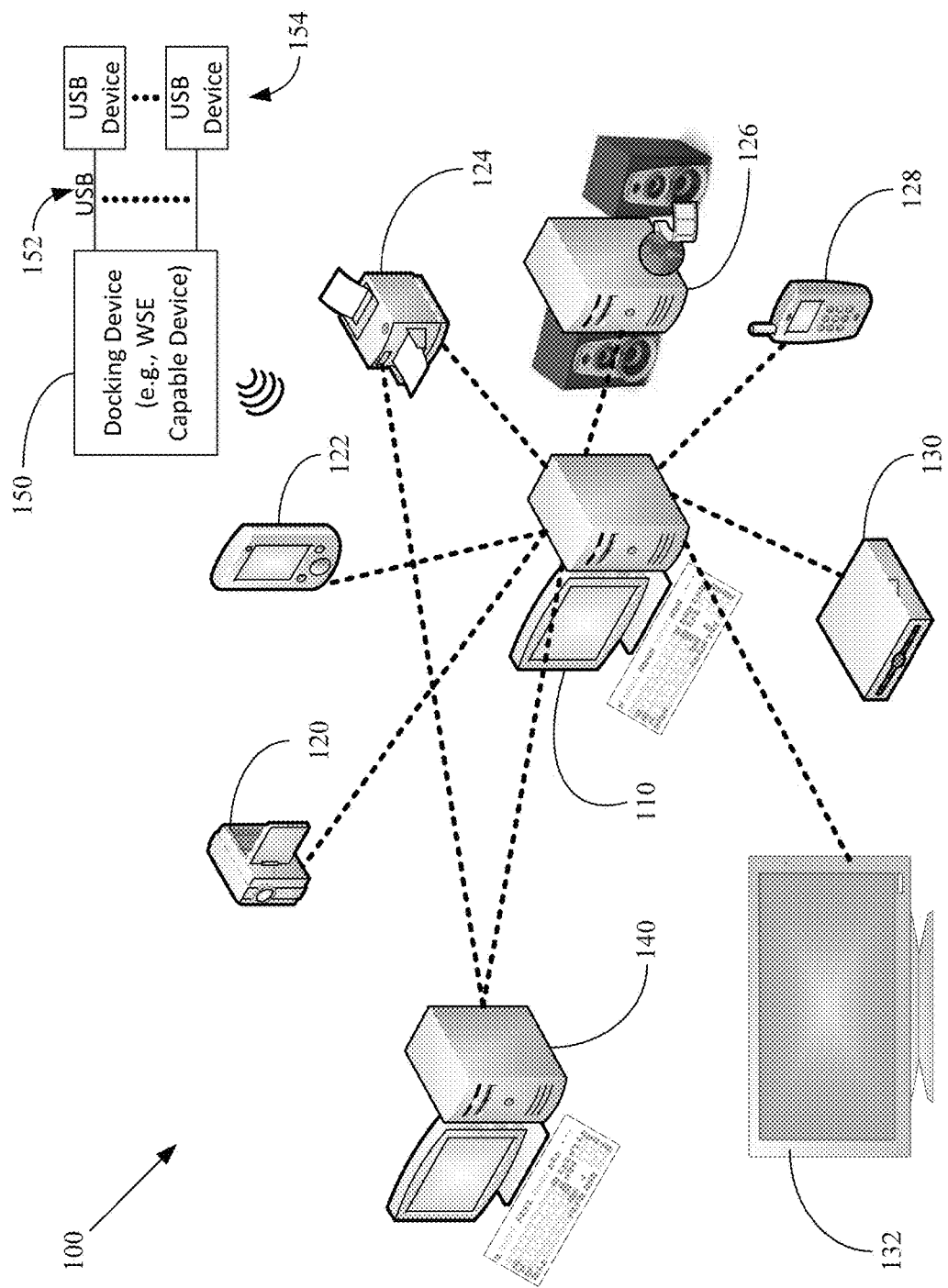
FIG. 1 illustrates a wireless system according to an embodiment.

FIG. 1 illustrates a wireless system 100 according to an embodiment. In FIG. 1, Universal serial bus (USB) Protocol Adaptation Layer (PAL) enables support of USB traffic over WiFi links and WiGig links. Accordingly, a first computing device 110, such as a personal computer, communicates wirelessly with wireless enabled devices within range. For example, the first computing device may wirelessly communicate with a video camera 120, a media player 122, a printer 124, a media server 126, a mobile phone 128, external storage 130 and a television 132. A docking device 150 is wirelessly coupled to at least the first computing device 110. USB devices 154 are coupled to the docking device using USB cables 152. However, those skilled in the art will recognize that this is not meant to be an exhaustive list, but is provided only as examples of devices that a first computing device may communicate with. The first device 110 may also communicate wirelessly with a second computing device 140. The second computing device 140 may wireless communicate with at least some of the other devices 120-132. For example, the second computer device 140 may share the printer 124 with the first computing device, and therefore communicate wirelessly with the printer 124.

On a wired USB, the user makes the decision of choosing and using a USB peripheral device by physically plugging it into the USB port on the USB host, e.g., by connecting a USB mouse to the personal computer (PC). In contrast, when used over a wireless medium, the user needs to rely on a discovery mechanisms provided by lower layers, e.g., MAC, IP, etc., to learn about USB PAL capable devices which are available for connection. While WiFi links may be used by P2P for device-to-device connectivity, available WSB capable devices may be discovered through the use of P2P. To extend the applicability of P2P to the WSB protocol, the WSB according to an embodiment provides for the discovery of WSB enabled devices using the WiFi P2P framework by carrying information for the user to be able to make an informed connectivity decision.

Figure 2:
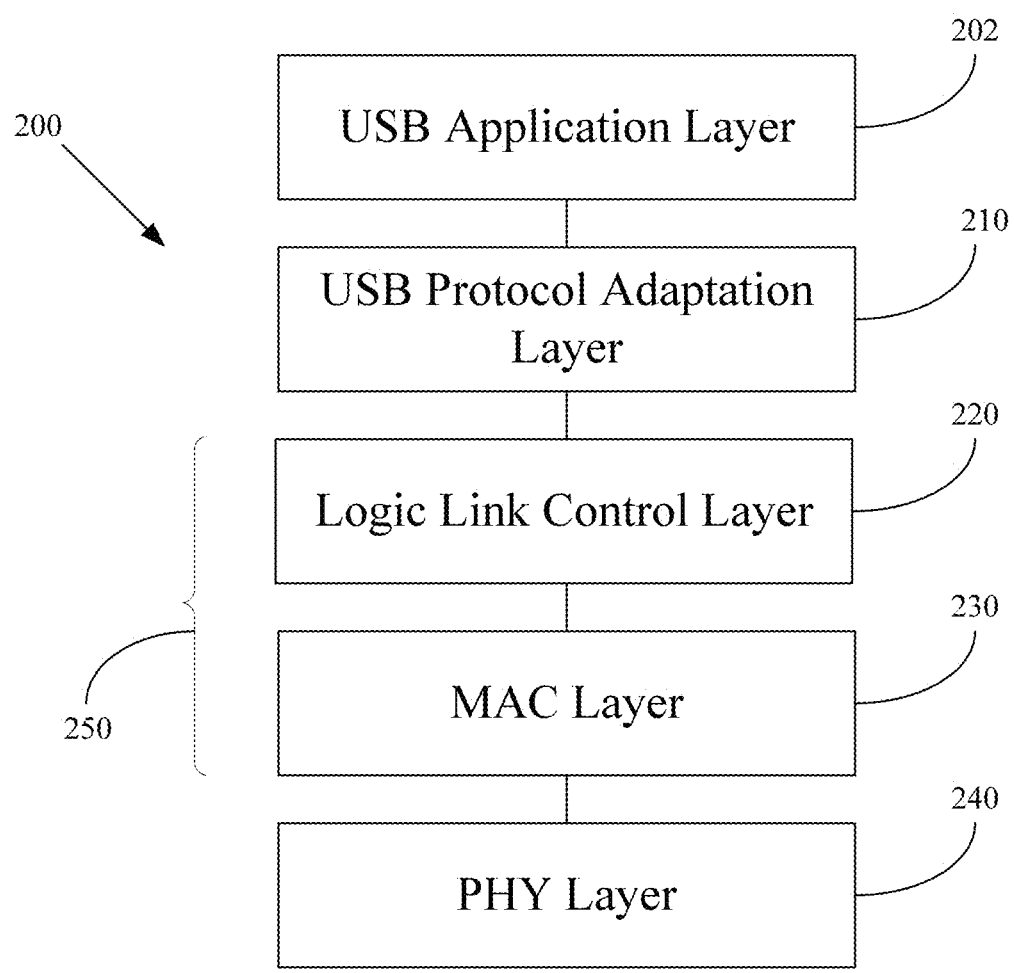
FIG. 2 illustrates the layers used to provide USB wireless connectivity according to an embodiment.

FIG. 2 illustrates the layers 200 used to provide USB wireless connectivity according to an embodiment. FIG. 2 shows a USB protocol adaptation layer (PAL) 210, the logic link control (LLC) 220, the media access (MAC) layer 230 and the physical (PHY) layer 240. The logic link control (LLC) 220 and MAC layer 230 form the data link layer 250. The USB PAL layer 210 may also sit on the network/transport layers (not shown). A device according to an embodiment passes data through the USB protocol adaptation layer (PAL) 210 and furthermore through the logic link control (LLC) 220 and MAC layer 230. The MAC layer 230 transmits the data through the PHY layer 240 in the assigned radio frequency spectrum. The USB PAL 210 is used to enable communication through a USB application layer 202 for use with other forms of MACs for other physical media such as USB cabling. The USB PAL 210 packages data and instructions from the USB application layer 202 to conform to the protocol used by the MAC layer 230.

FIG. 3 is a table showing the definitions for the WSB Attribute 300 according to an embodiment. The WSB Attribute 300 includes fields for information about the WSB device as well as identifying the USB device behind the PAL. The USB device behind the PAL may be a real USB device or a software emulation of a non-USB interface appearing as a USB interface. An attribute ID field 310 has a size of 1 octet 312 and identifies the type of P2P attribute 314. The attribute ID field 310 provides a WSB support field as a signaling mechanism indicating support of the WSB protocol by the P2P device. The length field 316 has a size of 2 octets 318 and specifies the length of the fields in the USB attribute 320. A USB Version field 322 has a size of 2 octets 324 and identifies the USB specification number of which the USB device behind the WSB PAL complies 326. More specifically, the protocol version identifies the version of USB which is supported by the USB device behind the PAL. This information assists the user with the selection to connect to a USB device.

The USB device class and sub-class, as well as the interface class and sub-class may be used either directly by the user or indirectly after being processed by the application on the device to learn about the functions provided by the device. For example, the USB device class and sub-class may be mapped to an icon and a user friendly description of the device.

The USB device class field 328 has a size of 1 octet 330 and identifies the USB interface (IF) device behind the WSB PAL 332. The USB device class field 328 may be set to zero if the USB interface (IF) defined device class of the USB device is not identified. The USB Device sub-class field 334 has a size of 1 octet 336 and identifies the USB-IF device sub-class of the USB device behind the WSB PAL 338. The USB Device sub-class field 334 may be set to zero if the USB IF defined subclass of the Device sub-class is not identified.

The WSB capability bitmap 340 has a length of 1 octet 342 and provides a set of parameters indicating P2P Device's WSB bitmap capabilities 344, as defined more specifically in FIG. 4. The WSB string field 346 has a length of 8 octets 348 and identifies a WSB friendly name 350. The WSB Icon field 352 has a variable length 354 and includes one WSB Icon depicting the WSB device in a user friendly manner 356. The format of WSB Icon field 352 is shown in FIG. 8. The USB configuration entry list field 358 has a variable length 360 and includes one or more USB configuration entities 362. The format of the configuration entry field 358 is described in more detail with respect to FIG. 5.

FIG. 4 is a table describing the format of the WSB Capability Bitmap field 400 according to an embodiment. Bits 0-2 410 provide a field to identify the WSB version 412 of the WSB protocol supported by the P2P device 414. The WSB version identifier 412 ensures devices that establish connection use the same version of WSB protocol. Bits 3-4 420 provide architectural element information 422 by indicating the devices role to other devices 424. The bits 420 of the architectural element field 424 identify the WSB architectural element supported by the P2P Device. A WSB device may take the role of a WSB Host 425, a WSB peripheral device 426, or a WSB hub (or dock) 427. A first value 428 indicates that a WSB host is supported by the device. A second value 429 indicates that a WSB hub is supported by the device. A third value 423 indicates that a WSB peripheral is supported by the device. A fourth field is reserved 421. The WSB role identifier 420 is a filed used by devices looking for other devices performing a specific role, e.g., a WSB host 425 looking for WSB peripherals 427, to narrow down the selection. If a device supports more than one WSB role, e.g., a device that may take the role of either a WSB Host 425 or a WSB Hub 426, then the device uses two WSB attributes, one for each role. Bit 5 430 is used as IP-support indicator 432 to communicate whether USB PAL over IP is an option supported by the P2P device. The IP support field 432 shall be set to a first value when the P2P device supports WSB IP option, and is set to a second value otherwise 434. This information enables other devices supporting the IP option to establish the connection based on IP if so desired. Bit 6 440 identifies whether the device is available for connection 442. The available for connection field may be set to a first value when the P2P device is available to connect with other WSB capable P2P devices, and set to a second value otherwise 444. Bit 7 450 is reserved 452.

FIG. 5 is a table describing the format of the USB Configuration Entry field 500 according to an embodiment. The first field 510 is 1 octet 512 in length and identifies the number of configurations contained in the USB Configuration List field 514. A second field 520 is the configuration list field. The length of the configuration field 520 has a variable length 522 and includes one or more configurations 524. The format of the configuration list field in shown in FIG. 6.

FIG. 6 is a table describing the format of the Configuration field 600 according to an embodiment. The first field 610 is the number of interfaces field and has a length of 1 octet 612. The number of interfaces field indicates the number of interfaces contained in the interfaces list field 614. The second field 620 is the interface list field. The interface list field 620 has a variable length 622 and includes one or more interfaces 624. The format of the interface field is shown in FIG. 7.

FIG. 7 is a table describing the format of the Interface List field 700 according to an embodiment. The USB-IF defines the device class of the USB device behind the PAL. The USB-IF defines the device sub-class of the USB device behind the PAL and the interface class for functions in the USB device behind the PAL. The USB-IF also defines the interface sub-class for functions in the USB device behind the PAL.

The first field is the interface class field 710 and has a length of 1 octet 712. The interface class field identifies the USB Interface (IF) defined interface class of the USB function exposed by the WSB PAL 714. The interface class field is set to zero if not identified. The second field is the interface sub-class field 720. The interface sub-class field 720 has a length of 1 octet 722 and identifies the USB-IF defined Interface Sub-class of the USB function exposed by the WSB PAL 724. The interface sub-class field 720 is set to zero if not identified.

FIG. 8 is a table describing the format of the WSB Icon field 800 according to an embodiment. A first field is the icon type length field 810 and has a length of 1 octet 812. The icon type length field identifies the length of the Icon Type field 814. A second field is the icon type field 820. The length of the icon type field is variable 822. The icon type filed 820 includes the MIME media type of the icon binary data 824. The icon type subfield is formatted in accordance with RFC-4288 and its value is selected from registered internet assigned numbers authority (IANA) multipurpose internet mail extensions (MIME) media types. The third field is the icon binary data length field. The icon binary data length field 830 has a length of 2 octets 832. The icon binary data length field 830 identifies the length of the icon binary data field 834. The fourth field is the icon binary data field 840 and has a variable length 842. The icon binary data field 840 includes the binary data for the icon encoded per the icon type field 844.

Thus, a WSB attribute according to an embodiment carries information to facilitate connectivity decisions by a user. The WSB attribute is carried in the P2P frames as discussed above. Examples of P2P frames include a beacon frame, a probe Request frame, a probe response frame, a directional multi gigabit (DMG) beacon and announce frame, an information request frame and an information response frame.

Figure 9:
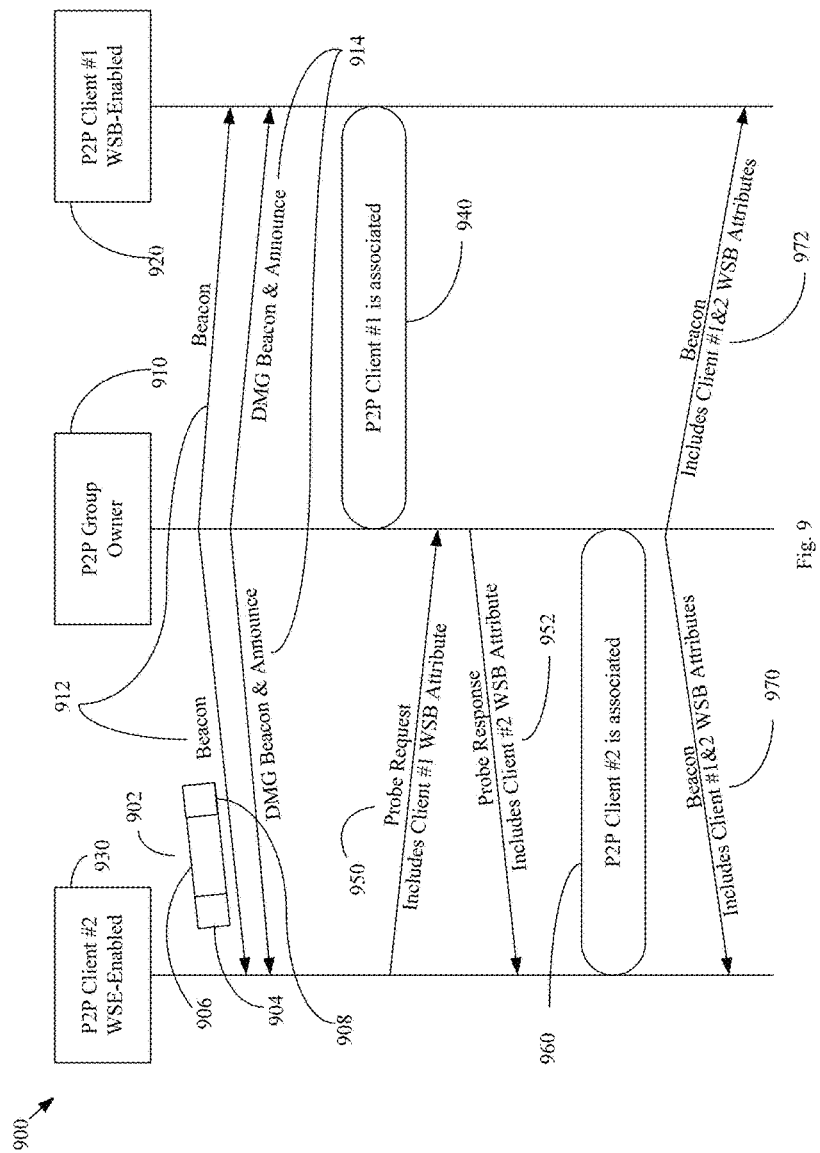
FIG. 9 illustrates WSB discovery in a point-to-point (P2P) framework according to an embodiment.

FIG. 9 illustrates WSB discovery in a P2P framework 900 according to an embodiment. Each type of frame transmitted in a P2P framework 900 is arranged into packets. In FIG. 9, a packet 902 is shown. The packet 902 includes a header 904 and a data section 906. Typically, control information is found in packet headers 904 with payload data 906 in between the header and a trailer 908. The header 904 may also provide identification of a destination. Wireless USB supports one-to-one links between a pair of devices, or one-to-multiple-device links. In either case, one device assumes ownership of the connection. The device that assumes ownership of the connection is referred to as a P2P group owner 910. The other devices are referred to as P2P client devices. FIG. 9 shows first and second P2P client devices. P2P client 1 920 is WSB enabled. P2P client 2 930 is WSE enabled.

The P2P group owner device 910 transmits a beacon frame 912 on the operating channel. The beacon frame 912 is a frame transmitted by the P2P group owner 910 that carries information about the P2P group and the devices present in the P2P group. In FIG. 9, P2P client 1 that is WSB enabled associates 940 with the P2P group owner 910. The P2P group owner 910 listens for a probe request frame 950 (or association request frame) from P2P client 2 930. The probe request frame 950 is transmitted by P2P client 2 930 to inquire about existing P2P groups and the devices present. The Probe Response frame 952 is transmitted by P2P group owner 910, in response to the probe request frame 950. The Probe Response frame 952 includes information about the P2P group and the devices present. P2P client 2 930 may then become associated 960 with the P2P group owner 910. Thereafter, the P2P group owner 910 transmits a beacon that includes the WSB attributes of P2P client 1 920 and P2P client 2 930.

A directional multi gigabit (DMG) beacon and announce frame 914 may be used to identify a P2P group operating at a frequency band higher than 45 GHz. The USB attribute may also be used to specify the form of an information element (IE), e.g., WSB IE, to be included in the frames that carry P2P IEs. An information request frame may be transmitted by a P2P device in a 60 GHz P2P to solicit information about other P2P devices that are present. The information request frame is not shown, but would appear in FIG. 9 much like probe request frame 950. An information response frame is transmitted by a P2P group owner in response to the information request frame. The information response frame is not shown, but would appear in FIG. 9 much like probe response frame 952.

To connect to the P2P group, the P2P client device 1 920 and the P2P client device 2 930 transmit an association request frame and the P2P group owner may transmit an association response frame. These frames are also not shown, but would also appear in FIG. 9 much like probe request frame 950 and probe response frame 952. Association allows a wireless device to send information to the devices within the group. The P2P group owner 910 transmits a first beacon 970 to P2P client 2 930 and a second beacon 972 to P2P client 1 920. The first beacon 970 and second beacon 972 identifies the attributes for P2P client 1 920 and P2P client 2 930.

Figure 10:
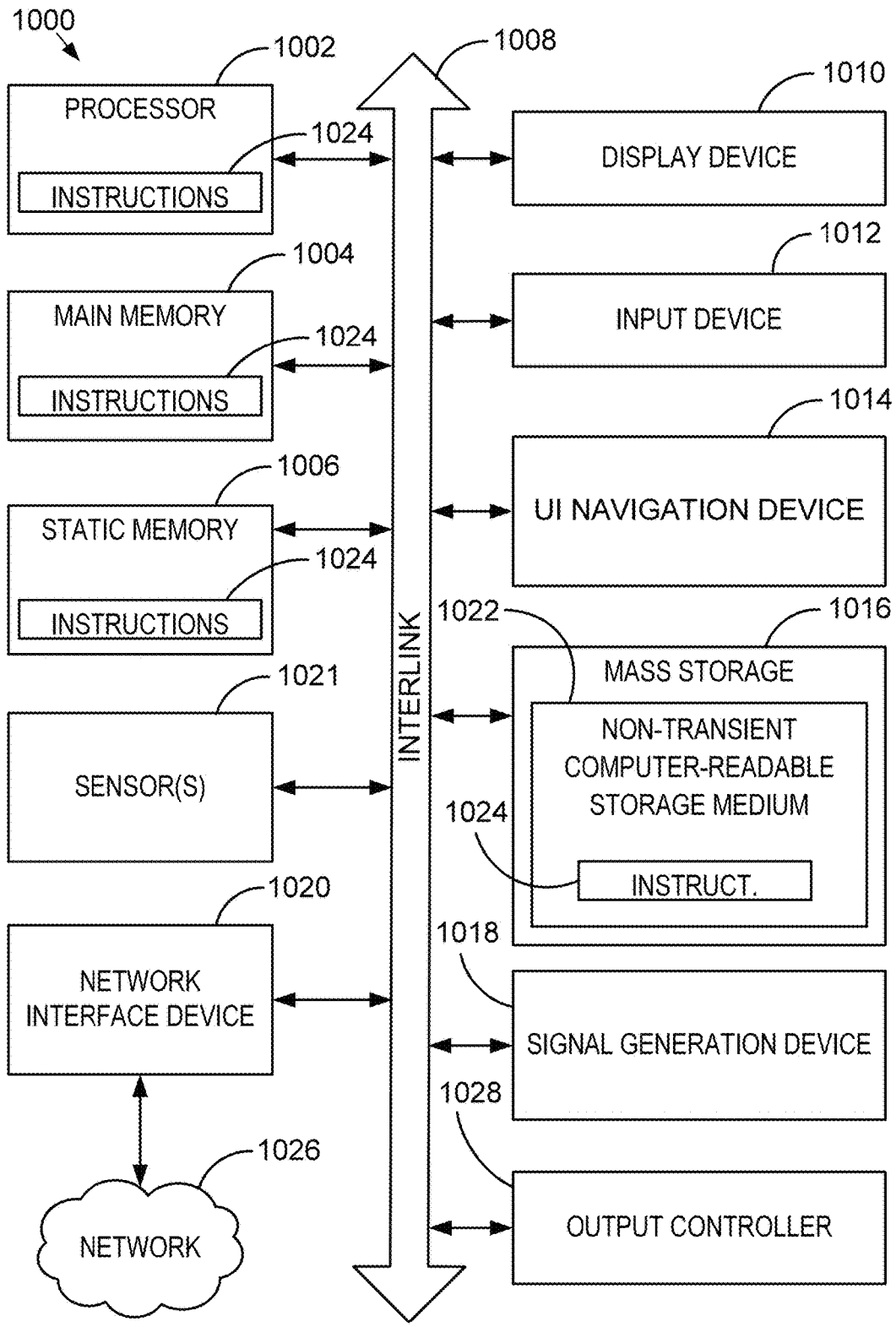
FIG. 10 illustrates a block diagram of an example machine upon which any one or more of the techniques (e.g., methodologies) discussed herein may perform.

FIG. 10 illustrates a block diagram of an example machine 1000 upon which any one or more of the techniques (e.g., methodologies) discussed herein may perform. In alternative embodiments, the machine 1000 may operate in a standalone mode or may be connected (e.g., networked) to other machines in a network mode. In a networked deployment, the machine 1000 may operate in the capacity of a server machine, a client machine, or both in server-client network environments. In an example, the machine 1000 may act as a peer machine in peer-to-peer (P2P) (or other distributed) network environment. In another example, the machine 1000 may act as a client (a station (STA)) or an access point (AP) during a link setup when domain crossing occurs.

The machine 1000 may further be a personal computer (PC), a tablet PC, a set-top box (STB), a Personal Digital Assistant (PDA), a mobile device, a web appliance, a network router, switch or bridge, or any machine capable of executing instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, at least some of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR)) connection to communicate or control one or more peripheral devices (e.g., a printer, card reader, etc.).

The signal generation device 1018 is arranged to generate a frame having a WiFi serial bus (WSB) attribute, the WSB attribute further including a plurality of fields to provide information to support connectivity decisions for a wireless USB device in a point-to-point network using a WSB protocol. The network interface device 1020 to transmit and receive frames that include a WSB attribute. The processor 1002 provides control network communications and is arranged to process the plurality of fields of the WSB attribute in a received frame to extract information in the plurality of fields to support connectivity decisions for a wireless USB device in a point-to-point network using a WSB protocol.

The storage device 1016 may include a non-transient computer-readable storage medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) that configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and compact disk-read only memory (CD-ROM) and digital versatile disk-read only memory (DVD-ROM) disks.

The instructions 1024 may further be configured for transmission and reception over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a personal area network (PAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi®), IEEE 802.16 standards (WiMax®) and others), peer-to-peer (P2P) networks, or other protocols now known or later developed.

For example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

The above detailed description includes references to the accompanying drawings, which form a part of the detailed description. The drawings show, by way of illustration, specific embodiments. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical constraints on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is to allow the reader to quickly ascertain the nature of the technical disclosure, for example, to comply with 37 C.F.R. §1.72(b). It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, subject matter of embodiments may lie in less than the features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An apparatus comprising:
   memory; and
   processing circuitry configured to:
   provide service information during Wi-Fi Serial Bus (WSB) discovery, the service information including a parameter to indicate a version of the universal serial bus (USB) specification supported by the apparatus;
   wherein the apparatus is a first apparatus, and the processing circuitry is further configured to wirelessly establish a Wi-Fi connection to a second apparatus, based on the version in the service information, at a link layer in a Wi-Fi Peer-to-Peer (Wi-Fi P2P) group, to establish a WSB connection over the Wi-Fi connection; and
   perform USB device communications over the Wi-Fi connection, after the WSB connection being established.

2. The apparatus of claim 1, wherein the processing circuitry has further logic to generate a signal to indicate whether the apparatus supports Internet Protocol (IP) transport.

3. The apparatus of claim 1, wherein the service information includes a user friendly description to identify the apparatus.

4. The apparatus of claim 1, wherein the processing circuitry includes logic to provide WSB architectural element service information, wherein the WSB architectural element service information indicates whether the apparatus is a WSB Host, a WSB Hub, or a WSB Peripheral.

5. The apparatus of claim 1, wherein the processing circuitry is configured to identify the apparatus as a P2P Group Owner.

6. The apparatus of claim 1, further including a signal generation device.

7. The apparatus of claim 1, further including a touch screen.

8. The apparatus of claim 1, further including two or more antennas.

9. The apparatus of claim 1, wherein the apparatus is configured to operate using a near field communication (NFC) protocol.

10. A non-transitory computer-readable storage medium that stores instructions for execution by one or more processors of a Wi-Fi Serial Bus (WSB) device to perform operations comprising:
    respond to a probe request frame from at least one other WSB device in a Wi-Fi Peer-to-Peer (Wi-Fi P2P) group;
    provide service information subsequently to responding to the probe request frame, the service information including a parameter to indicate a version of the universal serial bus (USB) specification supported by the WSB device;
    establish a WSB connection with the at least one other WSB device based on the service information; and
    perform USB device communications over the Wi-Fi connection, upon the WSB connection being established.

11. The non-transitory computer-readable storage medium of claim 10, wherein the WSB device is a P2P Group Owner.

12. The non-transitory computer-readable storage medium of claim 10, wherein the Wi-Fi P2P group operates at a frequency band higher than 45 gigahertz (GHz).

13. A Wi-Fi Serial Bus (WSB) device comprising:
    a network interface device, a processor, and a memory, the network interface device to:
    provide service information during WSB discovery, the service information including a parameter to indicate a version of the universal serial bus (USB) specification supported by the WSB device;
    wirelessly establish a Wi-Fi connection to at least one other WSB device, based on the service information, at the link layer in a Wi-Fi Peer-to-Peer (Wi-Fi P2P) group, to establish a WSB connection over the Wi-Fi connection; and
    perform USB device communications over the Wi-Fi connection, upon the WSB connection being established.

14. The WSB device of claim 13, wherein the service information is provided subsequently to performing a P2P probe request and P2P probe response exchange.

15. The WSB device of claim 13, further comprising two or more antennas.

16. The WSB device of claim 13, further comprising signal generation circuitry to generate a signal to indicate whether the WSB device supports Internet Protocol (IP) transport.

17. The WSB device of claim 13, wherein the WSB device is configured to operate at frequencies greater than 45 gigahertz (GHz).

* * * * *